United States Patent
Lienert et al.

(10) Patent No.: US 6,949,592 B2
(45) Date of Patent: Sep. 27, 2005

(54) LIQUID EPOXY RESIN EMULSIONS, METHOD FOR THE PRODUCTION AND USE THEREOF

(75) Inventors: Klaus-Wilhelm Lienert, Hamburg (DE); Gerold Schmidt, Hamburg (DE); Sascha Tödter-König, Hamburg (DE)

(73) Assignee: Dres. Fitznee, Muench & Kluin, Ratinger (DE)

( * ) Notice: Subject to any disclaimer, the term of this patent is extended or adjusted under 35 U.S.C. 154(b) by 66 days.

(21) Appl. No.: 10/468,563

(22) PCT Filed: Feb. 6, 2002

(86) PCT No.: PCT/EP02/01195
§ 371 (c)(1),
(2), (4) Date: Dec. 29, 2003

(87) PCT Pub. No.: WO02/066534
PCT Pub. Date: Aug. 29, 2002

(65) Prior Publication Data
US 2004/0087685 A1 May 6, 2004

(30) Foreign Application Priority Data
Feb. 21, 2001 (DE) .......................... 101 08 129

(51) Int. Cl.$^7$ ................................. C08L 3/00
(52) U.S. Cl. ................. 523/402; 106/287.22; 427/104; 427/116; 523/414; 525/396; 528/91
(58) Field of Search ........................ 528/91; 523/402, 523/414; 525/396; 427/104, 116; 428/413

(56) References Cited

U.S. PATENT DOCUMENTS

| | | | | |
|---|---|---|---|---|
| 4,663,072 A | * | 5/1987 | Cheung | 528/91 |
| 4,916,018 A | * | 4/1990 | Goel et al. | 428/414 |
| 4,987,163 A | * | 1/1991 | Becker et al. | 523/414 |
| 5,474,799 A | * | 12/1995 | Thigpen et al. | 427/104 |
| 5,523,336 A | | 6/1996 | Schreiber et al. | |
| 5,624,978 A | * | 4/1997 | Soltwedel et al. | 523/402 |

FOREIGN PATENT DOCUMENTS

| | | |
|---|---|---|
| DE | 42 32 220 | 4/1993 |
| DE | 196 13547 | 11/1996 |
| JP | 6/184261 | 6/1994 |

* cited by examiner

*Primary Examiner*—Randy Gulakowski
*Assistant Examiner*—Marc S. Zimmer
(74) *Attorney, Agent, or Firm*—Novak Druce & Quigg

(57) ABSTRACT

The invention relates to novel liquid epoxy resin emulsions which contain the following components, dissolved and/or dispersed in water: (A) at least one binding agent selected from the group made of epoxy resins and modified epoxy resins, (B) at least one non ionic thickener and (C) at least one catalyst for hardening, produced by reacting at least one boron trifluoride complex with at least one compound containing at least one epoxy group. The invention also relates to a method for the production and use thereof as an impregnating varnish for electrotechnical components, particularly for electrical winding items.

24 Claims, No Drawings

LIQUID EPOXY RESIN EMULSIONS, METHOD FOR THE PRODUCTION AND USE THEREOF

The present invention relates to novel aqueous epoxy resin emulsions which are suitable in particular for impregnating electrical windings. The present invention also relates to novel catalysts for the curing of aqueous epoxy resin emulsions.

Electrical components such as electrical windings, for example coils in motors and transformers, are customarily fixed. This is done by impregnating with a suitable varnish, followed by curing. The coils impregnated with an impregnating varnish in this way are more mechanically durable and conduct the heat better than unpregnated coils.

The state of the art is impregnation with unsaturated polyester resins. However, for certain applications (repairs), impregnating varnishes have been found to be suitable. Impregnating varnishes have been used for almost a century. Typically, these are solutions of resins (alkyd, polyester, polyesterimide resins) and hardeners (melamine resins, phenolic resins, capped isocyanates) in organic solvents (cf. W. Tillar Shugg, Handbook of Electrical and Electronic Insulating Materials, IEEE Press 1995). These varnishes have low viscosity, in order to penetrate readily into the windings, and, in addition to binders, catalysts and additives, contain large amounts of organic solvents. These are released in the course of the curing procedure and have to be disposed of.

Apart from these classic impregnating varnishes, aqueous varnishes have become established on the market. These varnishes typically contain a cosolvent for the binder whose residual acid is neutralized by an amine. For example, U.S. Pat. No. 4,375,528 A describes an impregnating varnish in which the cosolvent is butyl glycol and the neutralizing agent used is dimethylethanolamine. Both cosolvent and amine are released in the course of curing.

It is an object of the present invention to provide a solvent-free or substantially solvent-free, low-viscosity, water-based impregnating varnish which can be processed in equipment customary in electrical engineering, provides impregnations and coatings of high bond strength, and causes no corrosion of the electrical windings.

Accordingly, the novel aqueous epoxy resin emulsions have been found which comprise
(A) at least one binder selected from the group consisting of epoxy resins and modified epoxy resins,
(B) at least one nonionic thickener and
(C) at least one catalyst for the curing, preparable by reacting at least one boron trifluoride complex with at least one compound containing at least one epoxide group,
dissolved and/or dispersed in water.

A novel process for producing aqueous epoxy resin emulsions has also been found in which
(I) at least one binder (A), at least one nonionic thickener (B) and at least one additive (E) are dispersed in water and
(II) the resultant dispersion (I) is admixed with at least one catalyst (C).

Moreover, the novel use of the reaction products of at least one boron trifluoride complex with at least one compound containing at least one epoxide group as a catalyst (C) for the curing of aqueous epoxy resin emulsions has been found.

Not least, the novel use of compounds (D) having at least one nitrogen atom in the molecule as cocatalysts of the catalysts (C) has been found.

The aqueous epoxy resin emulsions according to the invention are solvent-free or substantially solvent-free. This means that their content of organic solvents, based on the aqueous epoxy resin emulsions, is below 5% by weight, with preference below 3% by weight and preferably below 1% by weight.

The aqueous epoxy resin emulsions according to the invention comprise at least one binder (A) selected from the group consisting of epoxy resins and modified epoxy resins. The epoxy resins (A) are preferably liquid.

Epoxy resins and modified epoxy resins (A) are familiar as testing and impregnating agents and are used worldwide (cf., for example, Proceedings Electrical Insulation Conference and Electrical Manufacturing & Coil Winding Conference, in 1997 pages 239–248, in 1999 pages 371–387 and pages 453–468). The disadvantage of the low and high molecular weight bisphenol A diglycidyl ether which is customarily used is the high viscosity (typically, approx. 8000 mPas) and the associated complicated processing (for example preheating of the object, vacuum impregnation).

According to the invention, the epoxy resins (A) are therefore emulsified in water. This results in a low-viscosity formulation. This formulation is also cosolvent-free in the sense explained above. Standard epoxy resins are not emulsifiable in water without additives. Water-emulsifiable epoxy resins (A) obtainable on the market have been modified and, in addition to bisphenol A, also comprise bisphenol F epoxy resins (A), and also typically a $C_{12}$–$C_{14}$-alkyl glycidyl ether or a glycidyl ester of a fatty acid. Both compound classes have an emulsifying action on the epoxy resins (A).

The epoxy resins (A) are standard commercial compounds and are sold, for example, under the brand Epikote® 828 from Shell.

The aqueous epoxy resin emulsions according to the invention also comprise at least one, in particular one, nonionic thickener (B). This is preferably a nonionic associative thickener whose structural features are a hydrophilic framework and hydrophobic groups which are capable of associative interactions in the aqueous medium. Preference is given to using nonionic associative thickeners based on polyurethane. A hydrophilic framework contained therein is polyurethane chains having polyether building blocks. Examples of suitable associative thickeners of this type are described in detail in the German patent application DE 196 13 547 A1, column 4 lines 9 to 41, Römpp Lexikon Lacke und Druckfarben, Georg Thieme Verlag, Stuttgart, New York, 1998, pages 599 and 600, "Verdickungsmittel", or in the textbook by Johan Bieleman, "Lackadditive", Wiley-VCH, Weinheim, 1998, pages 51 to 59. The associative thickeners are standard commercial compounds and are sold, for example, under the brand Acrysol® RM8 from Rohm & Haas.

Surprisingly, with the aid of the epoxy resins (A) and associative thickeners (B) to be used in accordance with the invention, outstanding storage-stable epoxy resin emulsions are obtained.

In addition, the epoxy resin emulsions according to the invention comprise at least one, in particular one, catalyst (C) for the curing.

When aqueous epoxy resin emulsions are catalyzed by a standard commercial boron trifluoride complex, in particular a customary and known boron trifluoride-amine complex (cf. H. Lee and K. Neville in Handbook of Epoxy Resins, 1967, Chapter 11–3), aqueous impregnating varnishes are obtained. However, this boron trifluoride-amine complex, like other amine complexes too, is not hydrolysis-stable and is hydrolyzed in an aqueous epoxy resin emulsion and does not remain functional. The bond strength of this impregnating varnish, determined to IEC 61033 method A, is therefore below that which would be expected of impregnating resins based on epoxy resins.

The catalyst (C) to be used in accordance with the invention is a reaction product of a boron trifluoride complex, in particular of a and boron trifluoride-amine complex with at least one compound containing at least one, in particular one, epoxide group.

Examples of suitable amines are primary alkylamines, in particular 2-propanamine.

Examples of suitable epoxide group-containing compounds are alkyl glycidyl ethers, in particular n-butyl glycidyl ether.

The catalysts (C) to be used in accordance with the invention are standard commercial compounds and are sold, for example, under the brand Anchor® 1115 from Air Products.

It has been found that, surprisingly, the catalysts (C) to be used in accordance with the invention can be used in aqueous epoxy resin emulsions and lead to storage-stable aqueous epoxy resin emulsions according to the invention which can be used in an outstanding manner as impregnating varnishes. These provide impregnations and coatings with bond strengths of up to 220 N at 155° C., determined to IEC 61033 method A.

The aqueous epoxy resin emulsions according to the invention and the impregnating varnishes according to the invention preferably contain, based on the epoxy resins (A), 4–15%, preferably 5–14% and in particular 7–13%, by weight of the catalysts (C).

The aqueous epoxy resin emulsions according to the invention and the impregnating varnishes according to the invention composed of the above-described obligatory constituents (A), (B) and (C) provide coatings and impregnations having an outstanding bond strength. However, under some circumstances, slight corrosion marks can form occasionally on the substrates (electrical windings, bundles of laminations). This effect is prevented in accordance with the invention when compounds (D) having at least one, in particular one or two, nitrogen atom(s) in the molecule are added to the formulation. Preference is given to selecting the compounds (D) from the group consisting of tertiary amines and heterocycles.

The tertiary amines (D) to be used in accordance with the invention preferably contain radicals which are selected from the group consisting of acyclic and cyclic, aliphatic, aromatic and heterocyclic organic radicals, in particular acyclic, aliphatic organic radicals. Examples of suitable tertiary amines (D) of this type are dimethylbenzylamine, triethylamine, tributylamine, triethanolamine, dimethylethanolamine, dimethylcetylamine, didecylmethylamine, dimethyllaurylamine, dimethyloctylamine and 4-dimethylaminopyridine, in particular dimethyloctylamine.

Preference is given to selecting the heterocycle (D) from the group consisting of imidazole and imidazoles which are substituted in the 1- or 2-position or in the 1- and the 2-position by acyclic and cyclic, aliphatic, aromatic and heterocyclic organic radicals. Examples of suitable substituted imidazoles are 1-benzyl-2-methylimidazole, 2-methylimidazole, 2-butylimidazole. Particular preference is given to 2-methylimidazole.

Surprisingly, the above-described compounds (D) do not adversely affect the stability of the aqueous epoxy resin emulsions, but rather effectively prevent the corrosion of the substrates as cocatalysts.

The aqueous epoxy resin emulsions according to the invention and the impregnating varnishes according to the invention contain, based on the epoxy resins (A), preferably 0.1–6.0%, preferably 1–5% and in particular 1.7–4%, by weight of the compounds (D).

Apart from the above-described constituents (A), (B), (C) and (D), the aqueous epoxy resin emulsions according to the invention may also comprise at least one customary and known additive (E). Examples of suitable additives (E) are defoamers, leveling assistants, wetting agents and corrosion inhibitors. Further examples are described in the textbook by Johan Bieleman, "Lackadditive", Wiley-VCH, Weinheim, 1998. The additives (E) are employed in the customary and known amounts.

The aqueous epoxy resin emulsions according to the invention are produced by mixing and homogenizing the above-described constituents (A) to (E) to a shear field. The customary and known apparatus such as stirred tanks, dissolvers, Ultraturrax or disperser discs can be used. The constituents can be mixed together in any desired sequence. However, it is advantageous in accordance with the invention when the above-described constituents (A) and (B), and also optionally (E), are dispersed or emulsified in water in a first process step (I), after which the resultant dispersion (I) is admixed with the above-described constituents (C), and also optionally (D), in a second process step (II).

The aqueous epoxy resin emulsions obtained in this way are outstandingly suitable as impregnating varnishes, in particular for impregnating electrical windings. Depending on the object, curing is effected, for example, in one hour at 120° C. plus 3 hours at 150° C. The impregnated electrical windings obtained in this way feature good surface properties, excellent bond strength and outstanding solvent resistance.

The invention is described in detail herein below with reference to the examples and the comparative examples.

EXAMPLES 1–6 AND COMPARATIVE EXAMPLE

EXAMPLE 1

Epoxy Resin Emulsion (A)

1000.0 g of Epikote® 828 (Shell epoxy resin), 50.0 g of Acrsysol® RM8 (nonionic associative thickener, Rohm & Haas), 2.5 g of Troykyd D777 (defoamer) were used to produce an emulsion by stepwise addition of 1052.5 g of water in a fast-running disperser. The emulsion had a viscosity of 800 mPas at 23° C. and a binder content of 49.1% (1 g/1 h/130° C.).

EXAMPLE 2

Impregnating Varnish 1

A mixture of 30.0 g of Anchor® 1115 (reaction product of boron trifluoride-2-propanamine complex with butyl glycidyl ether from Air Products), 30.0 g of water and 8.0 g of dimethyloctylamine was added to 650.0 g of emulsion (A) for example 1. The impregnating varnish was storage-stable over a period of weeks and had a viscosity of 650 mPas at 23° C. and a solids of 49.4% (1.5 g/2 h/130° C.).

The bond strength of the varnish was determined by IEC 61033 method A. It was 200 N at 155° C. The varnish was used to coat a rust-free, degreased steel sheet. After the curing, an impeccable film was obtained.

EXAMPLE 3

Impregnating Varnish 2

A mixture of 22.5 g of Anchor® 1115, 28.5 g of water and 6.0 g of dimethyloctylamine was added to 650.0 g of emulsion (A) for example 1. The impregnating varnish was storage-stable over a period of weeks and had a viscosity of 1020 mPas at 23° C. and a solids of 50.6% (1.5 g/2 h/130° C.).

The bond strength of the varnish was determined by IEC 61033 method A. It was 170 N at 155° C. and 130 N at 180° C. The varnish was used to coat a rust-free, degreased steel sheet. After the curing, an impeccable film was obtained.

EXAMPLE 4

Impregnating Varnish 3

A mixture of 39.0 g of Anchor® 1115, 49.4 g of water and 10.4 g of dimethyloctylamine was added to 650.0 g of emulsion (A) for example 1. The impregnating varnish was storage-stable and had a viscosity of 1550 mPas at 23° C. and a solids of 51.4% (1.5 g/2 h/130° C.).

The bond strength of the varnish was determined by IEC 61033 method A. It was 220 N at 155° C. and 120 N at 180° C. The varnish was used to coat a rust-free, degreased steel sheet. After the curing, an impeccable film was obtained.

EXAMPLE 5

Impregnating Varnish 4

A mixture of 18 g of Anchor® 1115, 18.0 g of water and 5.0 g of 2-methylimidazole was added to 600.0 g of emulsion (A) from example 1. The impregnating varnish was storage-stable over a period of weeks and had a viscosity of 1980 mPas at 23° C. and a solids of 49.9% (1.5 g/2 h/130° C.).

The bond strength of the varnish was determined by IEC 61033 method A. It was 90 N at 155° C. The varnish was used to coat a rust-free, degreased steel sheet. After the curing, an impeccable film was obtained.

EXAMPLE 6

Impregnating Varnish 5

250.0 g of Epikote® 828, 16.5 g of Acrsysol® RM8, 1.2 g of Troykyd® D777 were used to produce an emulsion by stepwise addition of 292.7 g of water with a fast-running disperser. 25.0 g of Anchor® 1115 in 25.0 g of water were added to this emulsion.

The bond strength of the varnish was determined by IEC 61033 method A. It was 170 N at 155° C. and 100 N at 180° C. The varnish was used to coat a rust-free, degreased steel sheet. After the curing, occasional traces of corrosion were observed under the film.

COMPARATIVE EXAMPLE 1000.0 g of Epikote® 255 (Shell epoxy resin) were used to produce an emulsion by stepwise addition of 1100.0 g of water with a fast-running disperser. To this were added 100.0 g of Anchor® 1115 in 100.0 g of water.

The bond strength of the varnish was determined by IEC 61033 method A. It was 80 N at 155° C. and 60 N at 180° C.

What is claimed is:
1. An aqueous epoxy resin emulsion comprising
   (A) at least one binder selected from the group consisting of epoxy resins and modified epoxy resins,
   (B) at least one nonionic thickener and
   (C) at least one catalyst for the curing, preparable by reacting at least one boron trifluoride complex with at least one compound containing at least one epoxide group,
   dissolved and/or dispersed in water.
2. An aqueous epoxy resin emulsion as claimed in claim 1, characterized in that the epoxy resins and the modified epoxy resins (A) are liquid.
3. An aqueous epoxy resin emulsion as claimed in claim 1, characterized in that the boron trifluoride complex is a boron trifluoride-amine complex.
4. An aqueous epoxy resin emulsion as claimed in claim 3, characterized in that the amine is a primary alkylamine.
5. An aqueous epoxy resin emulsion as claimed in claim 4, characterized in that the primary alkylamine is 2-propanamine.
6. An aqueous epoxy resin emulsion as claimed in claim 1, characterized in that the epoxide group-containing compound is an alkyl glycidyl ether.
7. An aqueous epoxy resin emulsion as claimed in claim 6, characterized in that the alkyl glycidyl ether is n-butyl glycidyl ether.
8. An aqueous epoxy resin emulsion as claimed in claim 1, characterized in that the nonionic thickener (B) is an associative thickener whose structural features are a hydrophilic framework and hydrophobic groups which are capable of associative interactions in the aqueous medium.
9. An aqueous epoxy resin emulsion as claimed in claim 8, characterized in that the associative thickener is an associative thickener based on polyurethane.
10. An aqueous epoxy resin emulsion as claimed in claim 1, characterized in that it comprises at least one compound (D) having at least one nitrogen atom in the molecule.
11. An aqueous epoxy resin emulsion as claimed in claim 10, characterized in that the compound (D) is selected from the group consisting of tertiary amines and heterocycles.
12. An aqueous epoxy resin emulsion as claimed in claim 11, characterized in that the tertiary amines (D) contain radicals which are selected from the group consisting of acyclic and cyclic, aromatic and heterocyclic organic radicals.
13. An aqueous epoxy resin emulsion as claimed in claim 12, characterized in that the tertiary amines (D) are selected from the group consisting of dimethylbenzylamine, triethylamine, tributylamine, triethanolamine, dimethylethanolamine, dimethylcetylamine, didecylmethylamine, dimethyllaurylamine, dimethyloctylamine and 4-dimethylaminopyridine.
14. An aqueous epoxy resin emulsion as claimed in claim 13, characterized in that the tertiary amine (D) is dimethyloctylamine.
15. An aqueous epoxy resin emulsion as claimed in claim 11, characterized in that the heterocycles (D) are selected from the group consisting of imidazole and imidazoles which are substituted in the 1- or 2-position or the 1- and 2-positions by acyclic and cyclic aliphatic, aromatic and heterocyclic organic radicals.
16. An aqueous epoxy resin emulsion as claimed in claim 15, characterized in that the substituted imidazoles are selected from the group consisting of 1-benzyl-2-methylimidazole, 2-methylimidazole and 2-butylimidazole.
17. An aqueous epoxy resin emulsion as claimed in claim 16, characterized in that the substituted imidazole is 2-methylimidazole.
18. An aqueous epoxy resin emulsion as claimed in claim 1, characterized in that it comprises additives (E).
19. An aqueous epoxy resin emulsion as claimed in claim 18, characterized in that the additives (E) are selected from the group consisting of defoamers, leveling assistants, wetting agents and corrosion inhibitors.

20. An process for producing aqueous epoxy resin emulsions as claimed in claim 1, characterized in that
(I) at least one binder (A), at least one nonionic thickener (B) and at least one additive (E) are dispersed in water and
(II) the resultant dispersion (I) is admixed with at least one catalyst (C).

21. The process as claimed in claim 20, characterized in that the dispersion (I) in process step (II) is also admixed with at least one compound (D) having at least one nitrogen atom in the molecule.

22. A process for varnishing a substrate, said process comprising impregnating and/or coating the substrate with the aqueous epoxy resin emulsion as claimed in claim 1.

23. The process as claimed in claim 22, characterized in that the substrate is an electrical component.

24. The process as claimed in claim 23, characterized in that the electrical component is an electrical winding.

* * * * *